Aug. 2, 1966　　　M. CONDE-GARRIGA　　　3,263,686
APPARATUS FOR SELECTING FILING CARDS
Filed July 12, 1962　　　　　　　　　　　　9 Sheets-Sheet 1
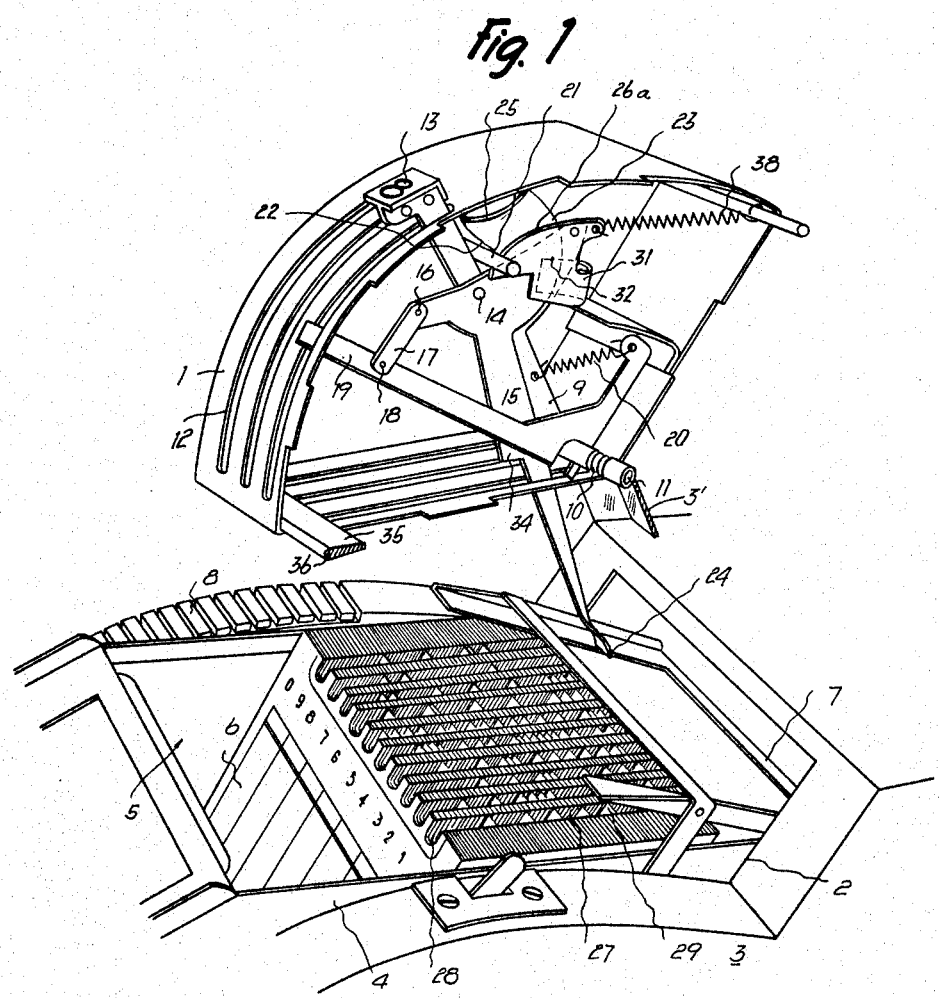
INVENTOR.
Mario Conde-Garriga
BY
Michael S. Striker

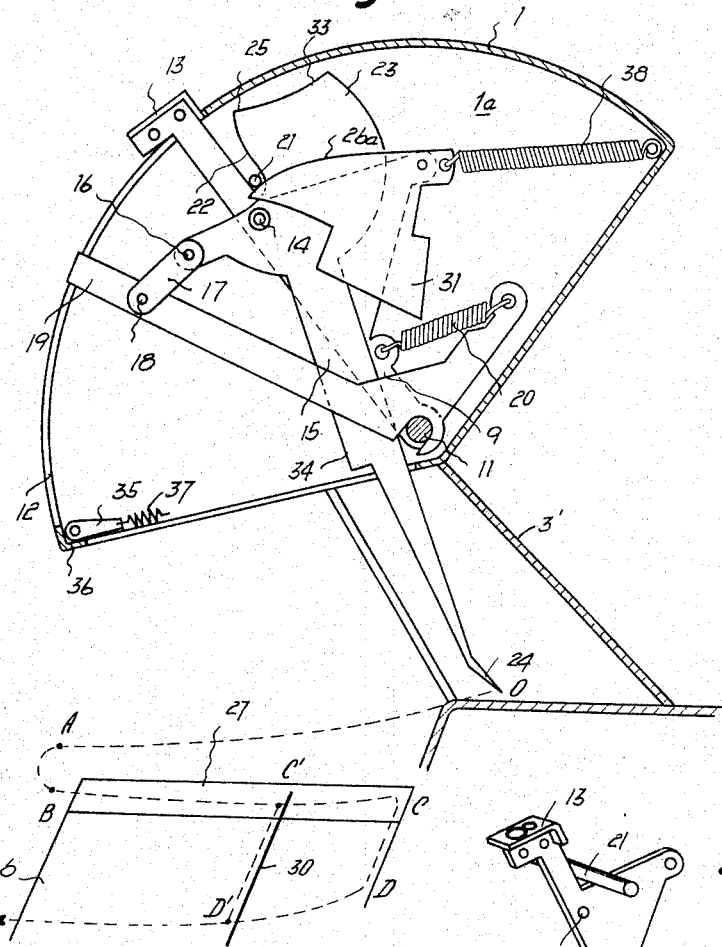
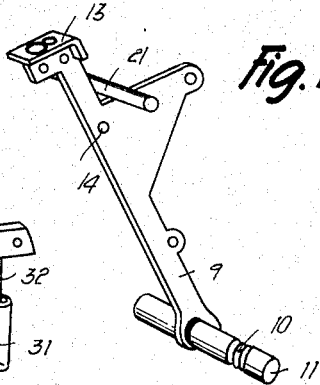
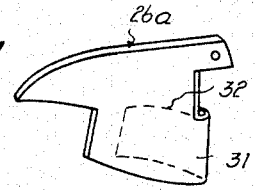

Aug. 2, 1966  M. CONDE-GARRIGA  3,263,686
APPARATUS FOR SELECTING FILING CARDS
Filed July 12, 1962  9 Sheets-Sheet 5

INVENTOR.
Mario Conde-Garriga
BY Michael S. Striker
Attorney

Aug. 2, 1966

M. CONDE-GARRIGA 3,263,686

APPARATUS FOR SELECTING FILING CARDS

Filed July 12, 1962

INVENTOR.
Mario Conde-Garriga

BY
Michael J. Striker

# United States Patent Office 3,263,686
Patented August 2, 1966

3,263,686
APPARATUS FOR SELECTING FILING CARDS
Mario Conde-Garriga, 617 Avda. Jose Antonio,
Barcelona, Spain
Filed July 12, 1962, Ser. No. 209,427
5 Claims. (Cl. 129—16.1)

The present application is a continuation-in-part application of the application Serial No. 791,368, filed February 5, 1959, and now Patent 3,052,509.

This invention relates to apparatus for selecting filing cards, folders and other similar material, which are placed on a compartment so that they are adapted to form a restricted oscillatory movement at right angles to the surface thereof.

Although suitable for operation with any kind of drawer-type card and the like material magazines, the apparatus of the invention is best suited for application on rotary filing apparatus having a revolving member formed with peripheral compartments and adapted to be rotated until a desired compartment faces an inspection opening formed in the casing of the apparatus.

The apparatus of the invention is fundamentally based on the provision of a plurality of stylus-like card separator members which are directed to the cards and effect the "searching for" and localisation of the desired card. Each of the stylus like members has, on its upper end, a re-entrant curve, the purpose of which is the approach thereof to the operator and a further-reentrant curve for facilitating the selection or "searching" operation effected by the end of the stylus-like member on the edges of the cards. The styus-like member is provided with a tooth or projection for guiding the end of the member towards the level at which the edges of the cards or the like are positioned. The end of the said stylus-member is curved in a direction away from the operator and is widened-out in the shape of a spade, with a view of permitting a satisfactory operation of the apparatus.

For the best understanding of the invention a set of drawings is enclosed to the present specification, showing a preferred embodiment of the latter.

Referring to the accompanying drawings:

FIG. 1 is a perspective view, partly in section, of the apparatus in its co-operation with a filing apparatus;

FIG. 2 is an elevational, longitudinal section of part of the apparatus of FIG. 1 and shown in starting position;

FIGS. 10 and 11 show, in perspective, details of members of the apparatus.

Figure 3:
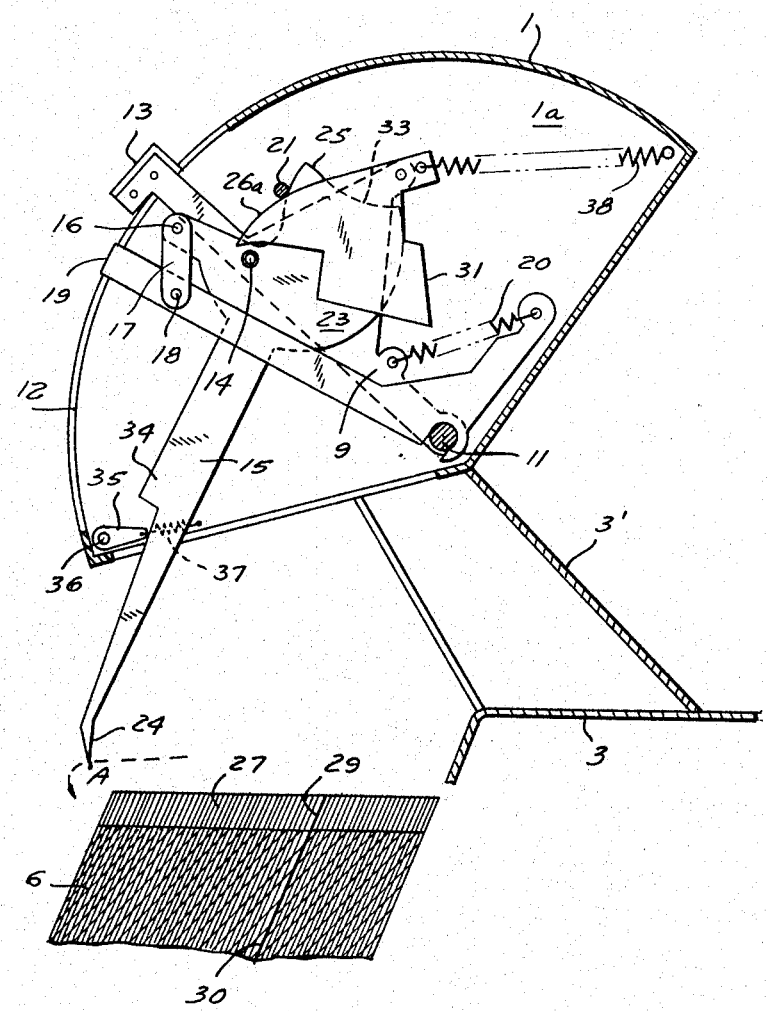
FIGS. 3–9 are views similar to FIG. 2 showing the elements of the apparatus in successive positions.

The key system for selecting cards comprises as many keys 9, with their stylus-like members 15 and corresponding mechanisms, as the cards 6 shown in FIG. 1 have indentations 28, only one specific key and the mechanism thereof being shown in the figures for the sake of clarity.

It will be seen that a casing 1 of the key system is supported over the opening 2 of the housing 3 by a bracket 3'. Housing 3 houses a rotary drum 4 formed with compartments 5 to lodge each a plurality of cards 6 and provided with movable locking means 7 for holding the cards in position during rotation of the drum. The desired compartment 5 is selected by means of a conventional mechanism which is operated by depression of a corresponding key 8, so that the desired compartment is presented under the casing 1 as more clearly described in the above mentioned Patent No. 3,052,509. This casing contains a plurality of key levers 9, only one of which is shown in the drawing, the lower end of which engage a circular groove 10 formed in a transverse axle 11 for oscillatory motion about the latter, while the upper end of the key lever 9 extends outside the casing through a slit 12 and is formed with a key 13. Intermediate the ends of each key lever 9 is articulated at 14 a stylus-like card separator member 15 which, in turn, is articulated at 16 to a link 17 articulated at 18 on a bell-crank lever 19 that, by means of a spring 20, rotates the stylus in the counterclockwise direction. The bell-crank lever 19 is also pivoted about axle 11 in the same manner as key lever 9.

Figure 4:
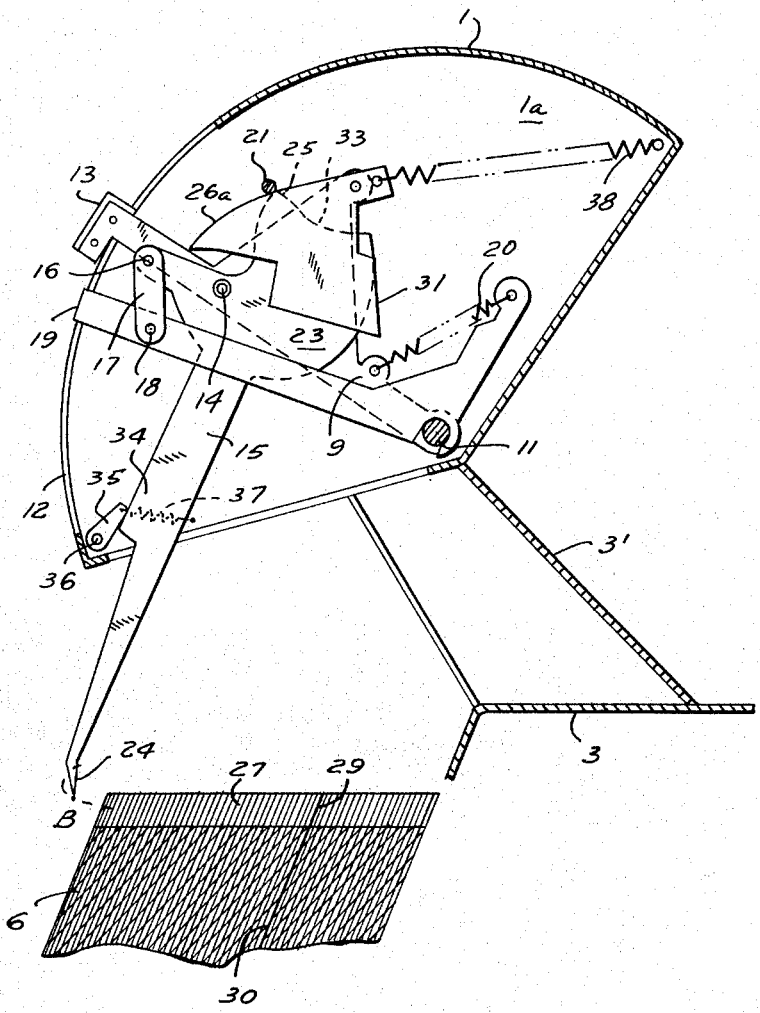
Figure 5:
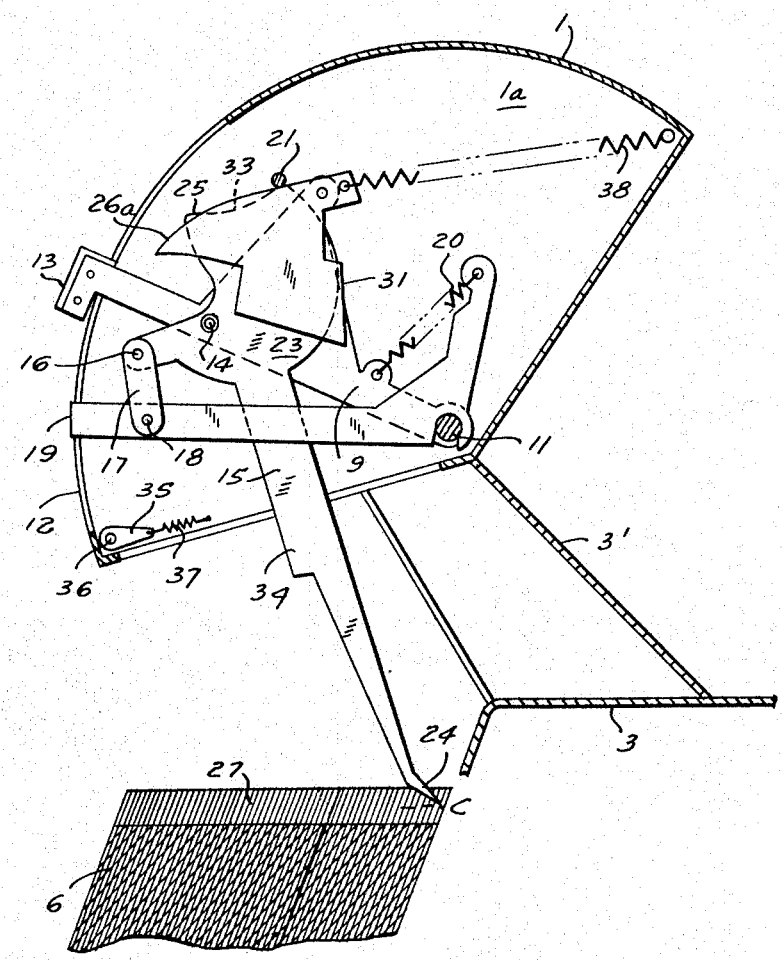
Figure 6:
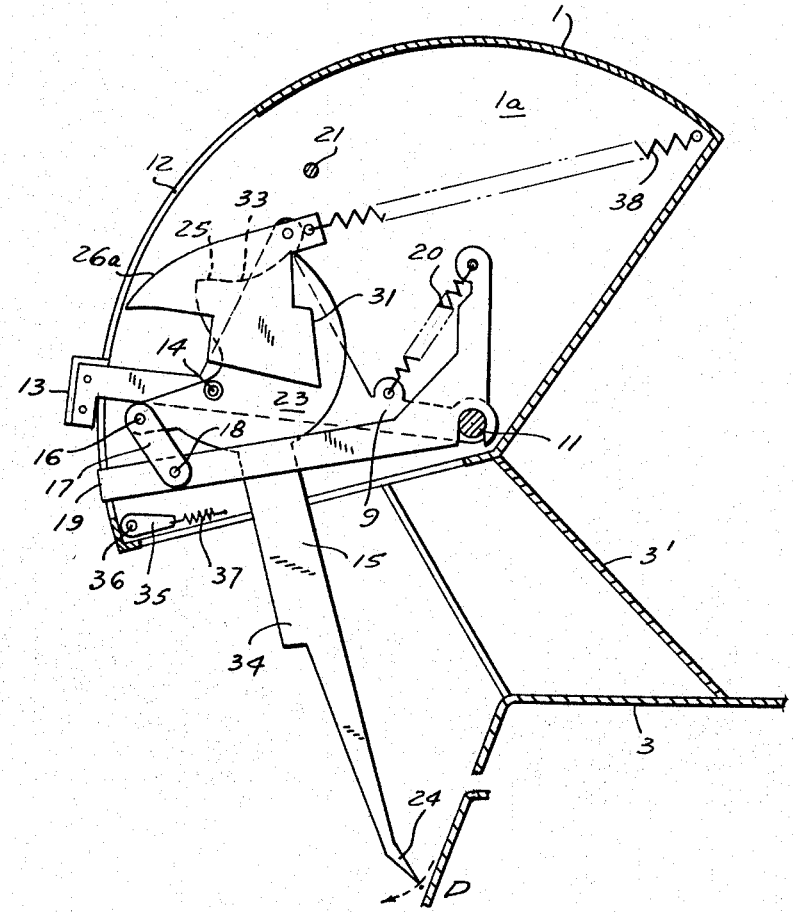
Figure 7:
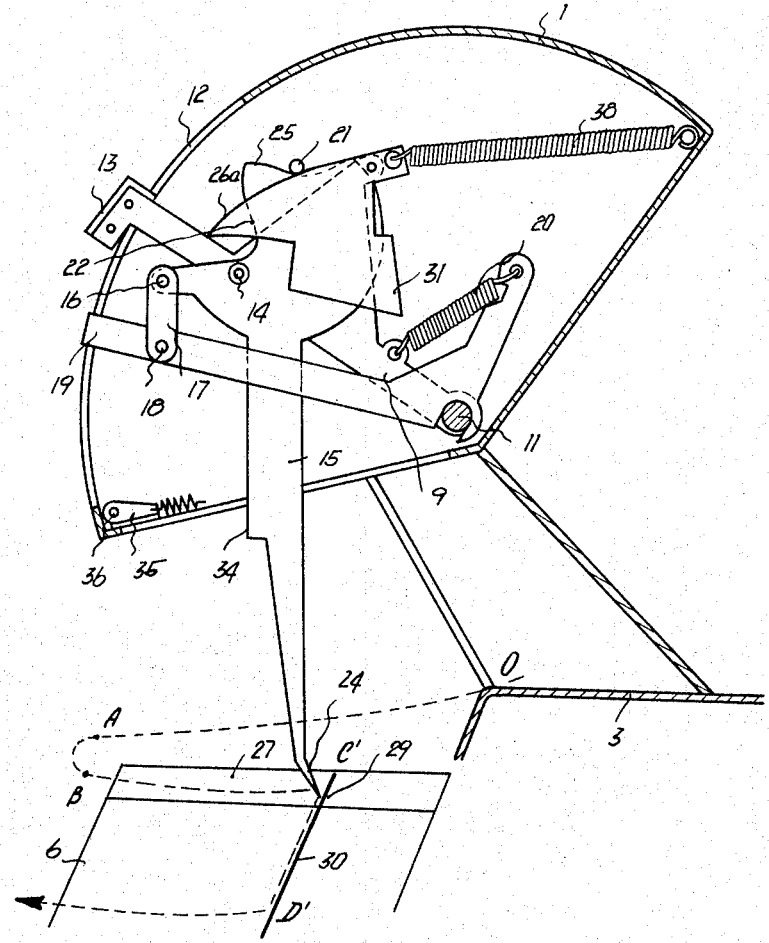
Figure 8:
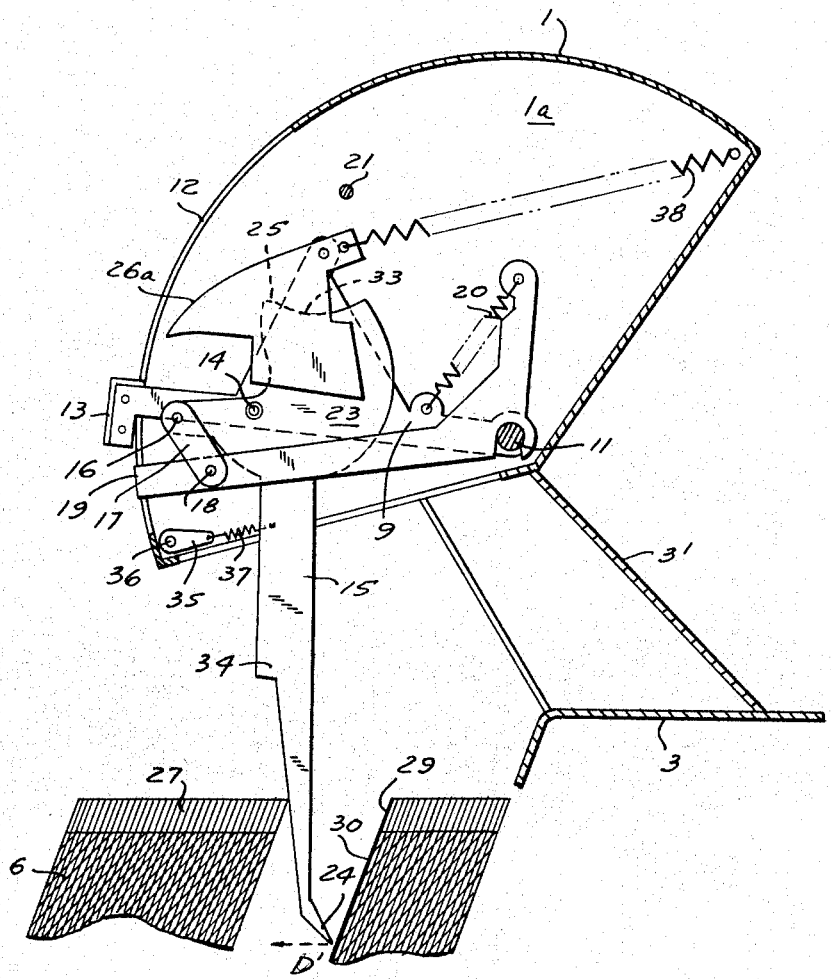
Figure 9:
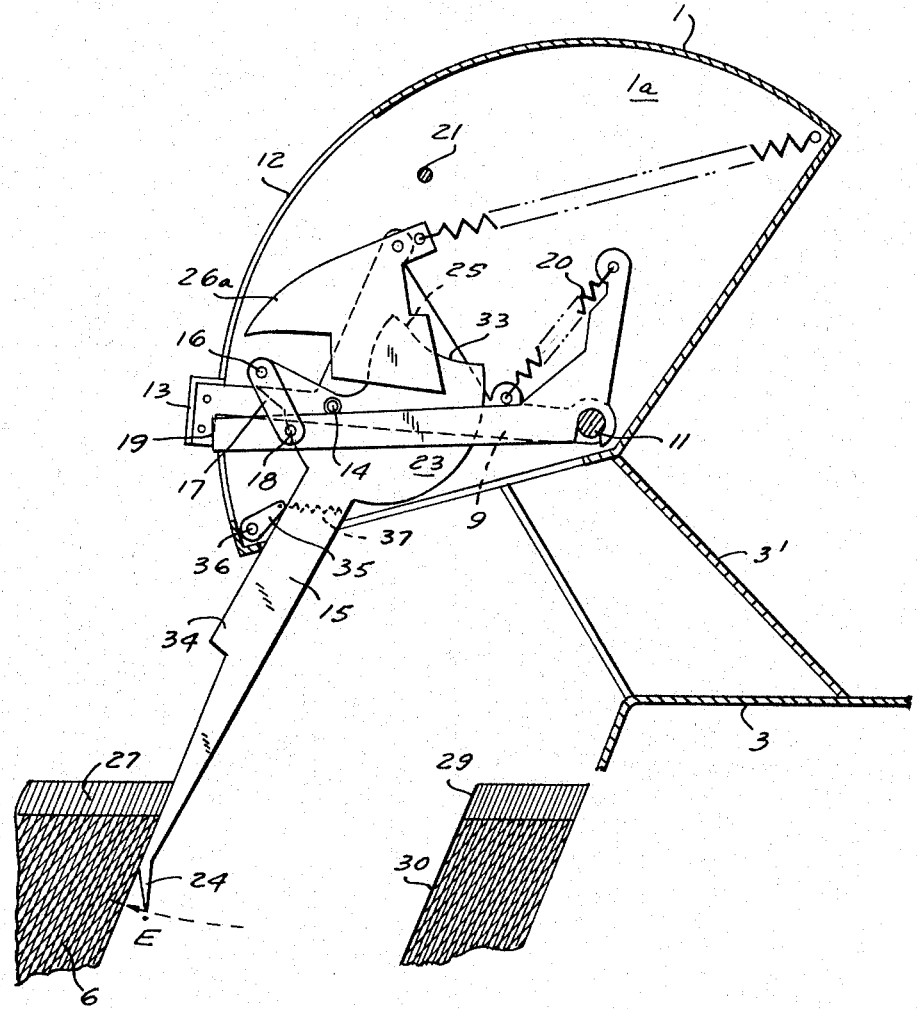

If pressure is applied to the key 13 in the position shown in FIG. 2, a bar 21 secured on the walls of the apparatus (only the rear wall 1a is shown in the drawings) acts upon the upper front edge 22 of a head 23 formed on the stylus-like member 15 and compels the tip 24 of the stylus 15 to advance towards the left until it passes the first cards, according to the line OA until it reaches the position shown in FIG. 3. The bar 21 then releases the edge 25 so that the tip 24 is moved according to the path AB to the position shown in FIG. 4, and at that instant a projection 34 on the stylus 15 touches an element 35 which halts the downward movement of the key lever 9, thus indicating to the operator that he should reduce his pressure on the key 13 to give the stylus 15 time to start its movement along the path BC and after further depression of the key lever 9 the bar 21 slides along the cam face 33 of the head 23 so that the tip 24 may perform the travel BC along one of the grooves 27 formed by the aligned indentations 28 of the cards 6. If no card edge 29 extending across the groove is encountered by the tip 24, the tip 24 moves to the rear wall of the compartment 5 as shown in FIG. 5 and further along path CD downwardly along this rear wall to the position shown in FIG. 6; otherwise the tip 24 slides along the face of the first card 30 having a projection 29 extending into the groove 27, according to path C′D′ from the position shown in FIG. 7 to that shown in FIG. 8. In both cases, when the lever 19—which is, in the meantime, moving simultaneously with key lever 9—reaches the lower end of the slit 12, it stops motion of link 17, thereby causing rotation of the stylus 15 in clockwise direction to the position E shown in FIG. 9, so that the cards ahead of card 30 are moved forward in order to expose the face of the selected card 30.

For the purpose of returning the assembly of elements to the initial position thereof, when the selection operation has been effected, there is provided a retaining element 31 which has a folded end 32 which, at the instant at which the card expelling movement of the member 15 takes place, mounts and locks with the concave cam face 33 of the head 23 preventing rotation in the counterclockwise direction of the member 15 against the biasing action of the spring 20, thus impeding the passage of the stylus under the bar 21. Subsequently, the said bar 21, sliding along the section 26a of the retaining element 31, releases the member 15. As the retained member 15 ascends, its projection 34 would contact the guide element 35 if the latter would not yield upwardly, pivoting on an axis 36.

The guide element 35 recovers its normal position as shown in the figures, with the aid of small springs 37 connected at opposite ends thereof to the free end of element 35 and to casing 1.

For the return of the assembly of element to the starting positon, once the selection operation has been completed, a spring 38 is provided.

It is obvious, of course, that some variations, such as size, shape and different materials can be used in the practice of the invention without departing from the scope thereof as defined in the appended claims.

I claim:

1. Apparatus for selecting filing cards comprising, in combination, a support; a compartment mounted on said support and having a front wall and a rear wall for holding a plurality of abutting index cards therebetween, said cards being respectively formed with a cutout defining in said plurality of abutting cards a groove and at least one of said cards having a portion extending transversely through said groove; and selector means mounted on said support above said compartment and including support means, actuator means mounted on said support means for movement from a rest position along an actuating stroke to an end position and back to said rest position, elongated card separator means mounted on said actuator means for movement therewith and for turning movement relative thereto, said card separator means having cam faces and a pointed lower end aligned with said groove, and control means mounted on said support means and including stationary means cooperating with said cam faces for causing said card separator means during movement of said actuator means along said actuating stroke to perform a composite movement so that said pointed end thereof moves first toward said front wall of compartment to be located forwardly of said index cards to move then rearwardly through said groove until it contacts said portion of said one index card, then downwardly along the surface of said one card facing said front wall, and finally forwardly to displace the cards located forwardly of said one card.

2. Apparatus for selecting filing cards comprising, in combination, a support; a compartment mounted on said support and having a front wall and a rear wall for holding a plurality of abutting index cards therebetween, said cards being respectively formed with a cutout defining in said plurality of butting cards a groove and at least one of said cards having a portion extending transversely through said groove; and selector means mounted on said support above said compartment and including a casing, a shaft extending transversely through said casing, a key lever pivotally mounted adjacent one end thereof on said shaft for turning movement from a rest position along an actuating stroke to an end position and back to said rest position, an elongated card separator member pivotally mounted on said key lever intermediate the ends of the latter for movement therewith and for turning movement relative thereto about a pivot axis parallel to the axis of said shaft, said card separator member having on an upper portion thereof above said turning axis a pair of cam faces, one extending substantially in direction of the elongation of said card separator member and the other extending from the upper end of said cam face transversely thereto, and said card separator member having a lower pointed end aligned with said grooves, said card separator member being, when said key lever is in said rest position, in a starting position in which said pointed end is located rearwardly and above said compartment, and control means mounted in said casing and including a stationary member engaging, when said card separator member is in said starting position, said one cam face thereof to cause said card separator during movement of said key lever along said actuating stroke to pivot about said pivot axis in a direction in which said pointed end moves forwardly beyond said front wall of said compartment whereby said stationary member slides upwardly along said one cam face, resilient means cooperating with said card separator member to pivot the latter in opposite direction when said stationary member passes said upper end of said cam face so that said pointed end moves in said groove rearwardly until it contacts said portion of said one index card to slide during further movement of said key lever downwardly along the surface of said one card facing said front wall, and means cooperating with said key lever and said card separator member to cause during the last part of said actuating stroke said pointed end to move forwardly to displace the cards located forwardly of said one card.

3. Apparatus for selecting filing cards comprising, in combination, a support; a compartment mounted on said support and having a front wall and a rear wall for holding a plurality of abutting index cards therebetween, said cards being respectively formed with a cutout defining in said plurality of abutting cards a groove and at least one of said cards having a portion extending transversely through said groove; and selector means mounted on said support above said compartment and including a casing, a shaft extending transversely through said casing, a key lever pivotally mounted adjacent one end thereof on said shaft for turning movement from a rest position along an actuating stroke to an end position and back to said rest position, an elongated card separator member pivotally mounted on said key lever intermediate the ends of the latter for movement therewith and for turning movement relative thereto about a pivot axis parallel to the axis of said shaft, said card separator member having on an upper portion thereof above said turning axis a pair of cam faces, one extending substantially in direction of the elongation of said card separator member and the other extending from the upper end of said cam face transversely thereto, and said card separator member having a lower pointed end aligned with said groove, said card separator member being, when said key lever is in said rest position, in a starting position in which said pointed end is located rearwardly and above said compartment, and control means mounted in said casing and including a stationary member fixed to said casing, a crank lever pivotally mounted intermediate the ends thereof on said shaft, said crank lever having a front arm extending forwardly of said shaft inclined with respect to said key lever and a rear arm, a tension spring connected at opposite ends to the free end of said rear arm and said key lever, respectively, a link pivotally connected at opposite ends to said front arm of said crank lever and to an upper forwardly extending portion of said card separator member, respectively, and stop means on said casing for limiting the turning movement of said key lever and said crank lever about said shaft axis, said stationary member engaging in said starting position of said card separator member said one cam face at a lower portion thereof, whereby during movement of said key lever along said actuating stroke said stationary member will slide upwardly along said cam face to cause said card separator member to tilt about said pivot axis in a direction in which the pointed end thereof moves forwardly toward said front wall of said compartment to be located forwardly of said index cards at the moment at which said stationary member reaches the upper end of said cam face and said tension spring being tensioned during said tilting movement of said card separator member to tilt the latter in opposite direction after said stationary member has passed said upper end of said one cam face so that the pointed end of said separator member moves then rearwardly through said groove until it comes in contact with said portion of said one card to slide then during further movement of said key lever downwardly along the surface of said one card facing said front wall until said front arm of said crank lever engages said stop means on said casing to cause in combination with said link said separator member to reverse its movement during the last part of the actuating stroke of said key lever so that said pointed end moves forwardly to displace the cards located forwardly of said one card.

4. An apparatus as set forth in claim 3 wherein said separator member is formed intermediate said pivot axis and said pointed end with a projection, and including abutment means on said casing against which said projection abuts at the moment at which said stationary member passes said upper end of said one cam face.

5. An apparatus as set forth in claim 4 and including resilient means connected to said key lever for returning the same from said end to said rest position.

References Cited by the Examiner

UNITED STATES PATENTS

| 1,116,909 | 11/1914 | Nyvall | 129—16.5 |
| 1,285,793 | 11/1918 | Reeves | 129—16 X |
| 2,524,704 | 10/1950 | Henderson | 40—104 |
| 2,994,740 | 8/1961 | Conkwright | 129—16.1 X |

FOREIGN PATENTS 121,896   6/1948   Sweden.

JEROME SCHNALL, *Primary Examiner.*